(12) United States Patent
Geldenhuys

(10) Patent No.: US 7,823,887 B2
(45) Date of Patent: Nov. 2, 2010

(54) SEALING BETWEEN COMPONENTS OF A ROTARY MACHINE

(75) Inventor: Siegfried Geldenhuys, Pretoria (ZA)

(73) Assignee: Weir-Envirotech (Proprietary) Limited, Pretoria (ZA)

( * ) Notice: Subject to any disclaimer, the term of this patent is extended or adjusted under 35 U.S.C. 154(b) by 708 days.

(21) Appl. No.: 11/055,561

(22) Filed: Feb. 10, 2005

(65) Prior Publication Data

US 2005/0191170 A1   Sep. 1, 2005

(51) Int. Cl.
*F16J 15/02* (2006.01)
(52) U.S. Cl. .................. 277/641; 277/611; 277/647; 277/626
(58) Field of Classification Search .............. 277/611, 277/626, 641, 639, 647; 285/111–113
See application file for complete search history.

(56) References Cited

U.S. PATENT DOCUMENTS

| | | | | | |
|---|---|---|---|---|---|
| 2,097,571 | A | * | 11/1937 | Moran | 285/374 |
| 2,465,175 | A | * | 3/1949 | Schwarz et al. | 277/562 |
| 2,665,151 | A | * | 1/1954 | Fisler et al. | 277/530 |
| 2,865,300 | A | * | 12/1958 | Garris | 415/172.1 |
| 2,975,799 | A | * | 3/1961 | Stilwell | 137/521 |
| 2,980,449 | A | * | 4/1961 | Dunton | 277/615 |
| 3,390,890 | A | * | 7/1968 | Kurtz | 277/625 |
| 3,680,894 | A | * | 8/1972 | Young | 285/112 |
| 4,036,512 | A | * | 7/1977 | Francis | 285/111 |
| 4,298,206 | A | * | 11/1981 | Kojima | 277/626 |
| 4,511,152 | A | * | 4/1985 | Fournier | 277/612 |
| 4,685,685 | A | * | 8/1987 | Iverson | 277/562 |
| 4,737,072 | A | * | 4/1988 | Schut | 415/173.6 |
| 4,834,430 | A | * | 5/1989 | Vassallo et al. | 285/379 |
| D330,073 | S | * | 10/1992 | Valls | D23/269 |
| 5,951,022 | A | * | 9/1999 | Gorman et al. | 277/626 |
| 6,142,484 | A | * | 11/2000 | Valls, Jr. | 277/602 |

* cited by examiner

*Primary Examiner*—Alison K Pickard
(74) *Attorney, Agent, or Firm*—Ladas & Parry

(57) ABSTRACT

In a casing of a rotary machine, cast components are sealingly mounted together by means of seals accommodated in (semi-) enclosed cavities. A ring seal includes an annular base and an annular skirt extending axially from the base. To ameliorate manufacturing tolerances, the seal defines circumferentially spaced, intermittent cavities to allow seal material to be deformed into the cavities as required. Land areas between cavities have cross-sectional surfaces increasing progressively from a free surface of small area to cause compressive force required for deformation to increase exponentially with an exponent larger than 1. The cavities may be peripherally spaced, being open at a radially outer surface of the seal. The seal may be of elastic material which may be incompressible. The skirt may taper away from the base. The base may have a projecting sealing lip. The skirt may have, at a free end, a slanted, peripheral lip.

16 Claims, 2 Drawing Sheets

SEALING BETWEEN COMPONENTS OF A ROTARY MACHINE

THIS invention relates to sealing between components of rotary machinery, especially sealing between components of pumps.

In a rotary machine, generally, a rotor is rotatable in a casing, on which one or more other stationary components, such as pipe flanges, wear liners, and the like, are mounted. Such components are frequently in the form of castings, which, in their "as cast" state, have wide dimensional tolerances. Thus, the capacities of sealing volumes between such components can vary between wide limits generally necessitating annealing the components and then machining faces which will define the sealing volumes. Sometimes, it is necessary to heat treat components after machining which may cause further, unacceptable, deformation requiring yet a further or final machining operation. Machining is often problematic due to asymmetry in the components, bearing in mind that components of rotary machines are intended to be generally round symmetrical. Furthermore, components generally require to be concentrically assembled.

Especially when sealing volumes are enclosed, tight tolerances are required when sealing material which is incompressible, such as rubber, is to be used.

This invention relates in general to a seal for sealing between components of a rotary machine at an annular sealing interface where opposing surfaces of the components define an enclosed or partially enclosed seal volume, of generally predetermined shape, configuration and orientation, between relatively high pressure and low pressure zones, the seal being in the form of a ring of pliable material and defining a plurality of cavities arranged to accept deformed material to allow deformation of the material of the seal into cavities, the seal including a skirt which extends generally longitudinally, which has radially inner and outer peripheral surfaces, and which is generally wedge shaped, a taper end of the skirt then having a free end which is intended to be positioned at a high pressure zone of the seal volume.

In accordance with a first aspect of this invention, in a seal of the kind described, said cavities alternate with land areas, the cavities and land areas being distributed peripherally, cross sectional surfaces through the land areas at respective radii decreasing progressively from a surface of the skirt to cause compressive force, required to cause deformation of the land areas, to increase exponentially with an exponent larger than 1.

Preferably, the cavities and the land areas respectively may be oriented longitudinally, the cavities and land areas being spaced peripherally.

In one kind of embodiment, the cavities may be open along the radially outer surface of the skirt being at a maximum, the respective cross-sectional surfaces of the land areas increasing with decreasing radius. Thus, advantageously, radially outer surfaces of the land areas may be convexly rounded.

In accordance with a second aspect of this invention, in a seal of the kind described, said pliable material is elastic and has deformation/stress characteristics falling within the following range and having the following values:

for elongation of 100%, a tensile stress of between 0.2 and 1.8, preferably about 1 $N/mm^2$;

for an elongation of 200%, a tensile stress of between 0.8 and 4.8, preferably about 2.7 $N/mm^2$;

for an elongation of 300%, a tensile stress of between 12.2 and 24.7, preferably about 18.5 $N/mm^2$.

The material may be an appropriate grade of natural or synthetic rubber. It may, for example, be an appropriate urethane.

The material may be substantially incompressible.

In accordance with a third aspect of this invention, in a seal of the kind described, the skirt extends from a base which has radially inner and outer faces and a back intermediate said inner and outer faces, the inner and outer faces converging in a direction away from said back.

In a preferred embodiment, the base, in cross-section, may be partially hollow, said cavities being contained at least partially between the inner and outer faces, the seal including land areas, in amongst which the cavities are dispersed, the land areas intruding in between the inner and outer faces and up to the back. The inner and outer faces of the base may be most widely spaced proximate the back, and may be adapted for use with a seal cavity which is correspondingly shaped, to promote sealing pressure to maintain sealing in the region of the base, regardless of the status of the sealing pressure and seal material deformation.

In accordance with a fourth aspect of this invention, in a seal of the kind described, said seal comprises an annular base from which the skirt extends longitudinally, the annular base being of larger annular thickness than a thicker end of the skirt, the base having along one surface thereof a projecting peripheral base lip configured to contact an annular zone of the seal cavity.

In one kind of embodiment said base lip may be along a radially outer surface of the seal, and may be oriented radially outwardly and toward a relatively high pressure end of the seal cavity. The base lip may be in the form of a re-entrant lip along an outer peripheral surface of the base.

In accordance with a fifth aspect of this invention in a seal of the kind described, the skirt has, at its free end, a skirt lip slanted to press against a corresponding annular portion of said high pressure zone.

The skirt lip may be slanted radially inwardly to be offered to a radially inner surface of the seal volume in use.

In accordance with a sixth aspect of this invention, in a seal of the kind described, one of the inner and outer peripheral surfaces of the skirt includes an oblique section shaped and oriented to match an opposing surface defining the seal volume, but at an angle selected to press an end of the skirt toward its free end against said opposing seal surface of the seal cavity.

Said oblique section may be along the radially inner peripheral surface of the skirt, said oblique section being a-cylindrical and tapering toward the free end of the skirt.

Said one of the inner and outer peripheral surfaces of the skirt may have, in series with said oblique section, a decumbent section oriented to lie decumbently with a corresponding surface of the seal volume. Said decumbent section may be cylindrical, may be along the radially inner periphery of the seal surface, and may be toward the low pressure end of the seal.

In accordance with a seventh aspect of this invention, in a seal of the kind described, one of the radially inner and outer peripheral surfaces of the seal is configured to lie against a corresponding surface of the seal cavity, the other having said cavities in alternating arrangement with land areas, in which an annular portion toward one end of the skirt is chamfered relative to an opposing seal surface to facilitate assembly of the seal in the seal volume.

The radially inner surface may be smoothly curved, the radially outer surface having the open cavities and land areas.

The chamfered portion may be at the free end of the skirt.

The invention extends to a combination of a rotary machine having components defining an annular sealing interface where opposing surfaces of the components define an enclosed or partially enclosed seal volume, and a seal in accordance with any aspect of this invention.

The invention is now described by way of example with reference to the accompanying diagrammatic drawings. In the drawings FIG. 1 shows, fragmentarily, in axial section, a slurry pump in accordance with the invention;

Figure 1:
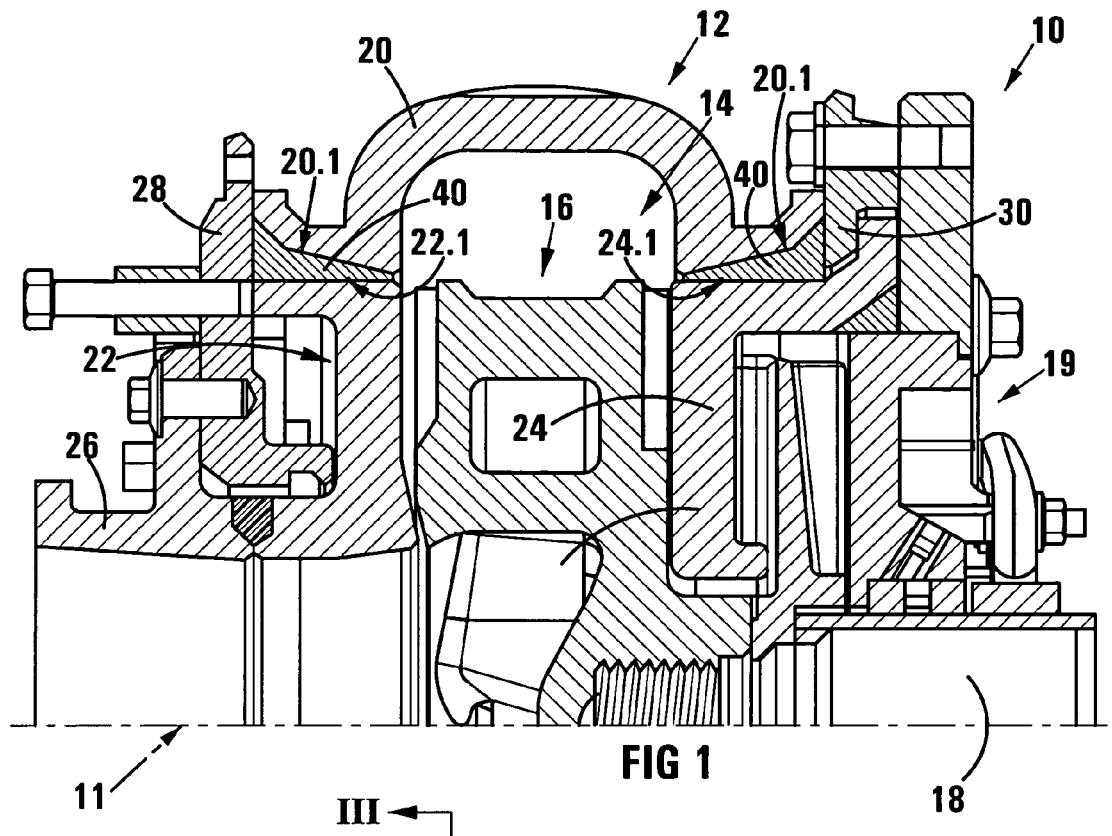

With reference to FIG. 1 of the drawings, a rotary slurry pump in accordance with this invention is generally indicated by reference numeral 10. The slurry pump 10 is generally symmetrical (except for a volute and an outlet flange thereof) to a centre line generally indicated by reference numeral 11. Only one half of the pump, to one side of the centre line 11, is shown in axial section.

The pump 10 comprises a pump casing generally indicated by reference numeral 12 and providing an inlet 26 and an impeller cavity and volute generally indicated by reference numeral 14 for accommodating a rotary impeller 16. An outlet in communication with the volute is not shown in the drawing. The impeller 16 is carried on a rotary shaft 18 by means of which the impeller is rotated in use within the stationary casing 12.

Sealing is required along the end of the casing 12 corresponding to the position of the shaft 18, and which is generally referred to as the dry end or the drive end. The sealing is generally indicated by reference numeral 19. It is of composite structure and only one aspect thereof is discussed further.

The pump casing 12 is of composite structure, comprising an outer, peripheral main casing portion 20 in the form of a peripheral cap. It further comprises a pair of opposing end liners, more specifically a suction end liner 22 on a suction side of the pump, and a drive end liner 24 on a drive end or dry end of the pump 10. The liners 22, 24 are mounted partially in conjunction with liner clamps 28, 30. At both ends, the main casing portion 20 has peripheral seats generally indicated by reference numerals 20.1. Each seat 20.1 diverges axially outwardly in steps, initially having a first, relatively shallow divergence angle, followed by a substantially steeper divergence angle in series with the first mentioned divergence angle.

Complementally, the suction end liner 22, and the drive end liner 24 each has a radially outwardly facing peripheral seat 22.1, 24.1, which is cylindrical.

Figure 2:
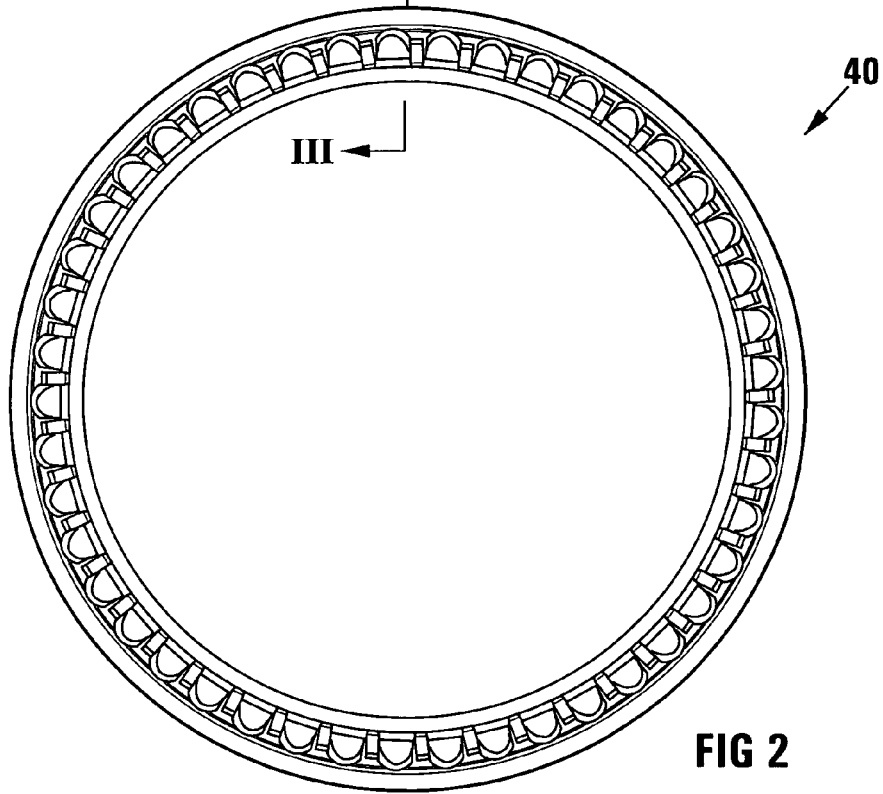
FIG. 2 shows, in axial view, a seal in accordance with the invention forming part of the slurry pump of FIG. 1.
Figure 3:
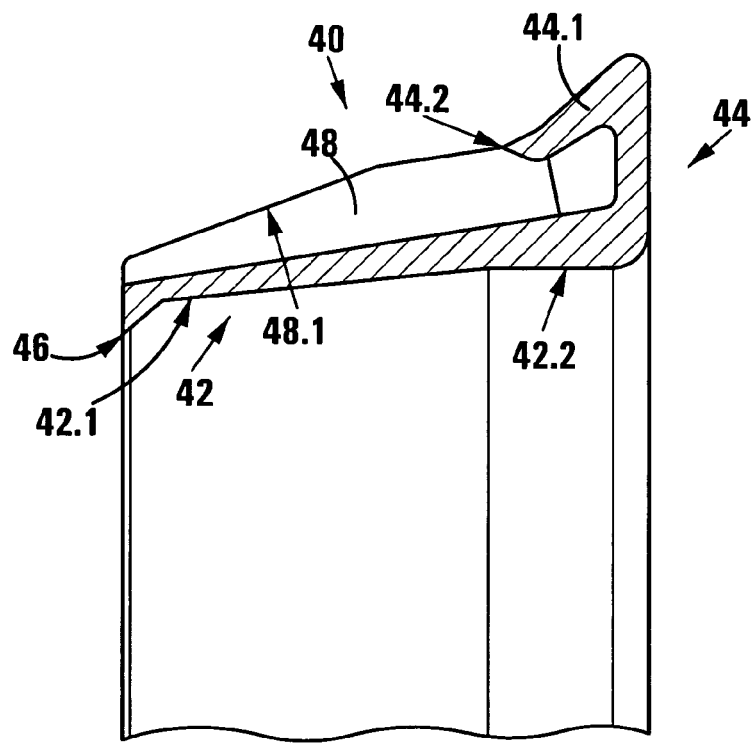
FIG. 3 shows, fragmentarily, in axial section, to an enlarged scale, the seal of FIG. 2.
Figure 4:
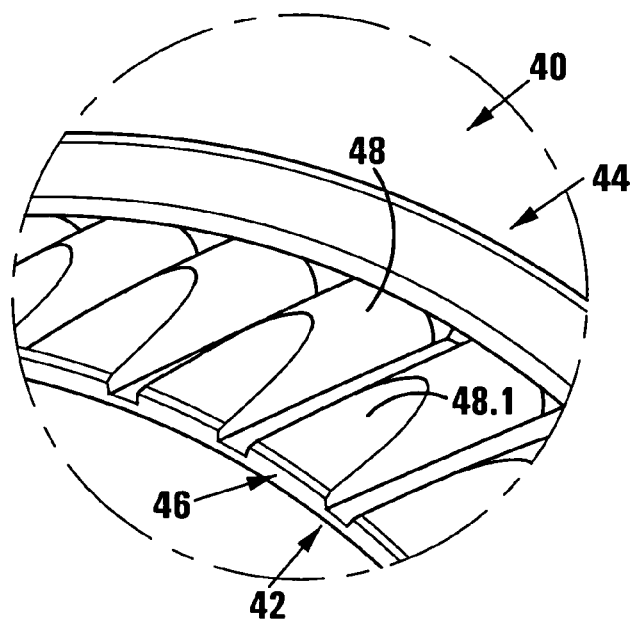
FIG. 4 shows, fragmentarily, to an enlarged scale, in three-dimensional view, the seal of FIGS. 2 and 3.

When assembled, the opposing seat pairs 20.1, 22.1 and 20.1, 24.1 form therebetween annular seal cavities within which seal rings 40 are provided. The seal rings 40 are identical, or substantially identical. Thus only one of the seal rings is described in more detail. The seal ring 40 embodies the subject matter of this invention. It is illustrated and is now described in more detail with reference to FIGS. 2 and 3.

When seen in cross-section, the seal 40 includes a peripheral skirt generally indicated by reference numeral 42, extending from a profiled, generally "U" shaped base 44 lying on its side as seen in cross section. The skirt 42 is in the form of an elongation of a radially inner one of the limbs of the "U" shaped base 44. The skirt tapers from a relatively thicker cross-section at the base 44, to a relatively thinner cross-section at a free end thereof. An initial section of the skirt 42, at the base 44 and indicated by reference numeral 42.2, is cylindrical corresponding to the orientation of the seat 22.1, 24.1. Toward the free end, a further section, indicated by reference numeral 42.1, is sloped toward the axis, thus tapering toward the free end to secure an interference fit over the respective seat 22.1, 24.1.

An opposed, radially outer limb of the "U" shaped base 44, generally indicated by reference numeral 44.1, slopes toward the skirt 42 and has an annular, radially outwardly tapering lip having an inner extremity 44.2.

The free end of the skirt 42 tapers in a radially inwardly turned annular lip 46.

The seal 40 comprises a plurality of longitudinally oriented, circumferentially spaced land areas 48. The land areas 48 are roughly in the form of fingers extending from a back of the base 44 initially intermediate the opposed limbs, to the end of the skirt 42. Each land area 48 is of part round cross-section, being of convex shape. They are spaced to provide corresponding cavities intermediate the land areas 48. Each land area 48, toward its free end, is chamfered as shown at 48.1. The cavities extend partially into the "U" shaped base 44.

The seal 40 is in the form of a moulding of synthetic elastomeric material such as rubber, urethane, or the like. The deformation/stress characteristics of the material are important, as described above in accordance with the second aspect of the invention.

Preferably, the seal 40 has an interference fit over its radially inner seat 22.1, 24.1 such that a deformation of between about 6% and about 4% is provided, i.e. such that a mean inner diameter of the seal 40 is between about 0.94 and about 0.96 of the outer diameter of the respective seat 22.1, 24.1.

Furthermore, the included angle of the taper face 42.1 is between about 10° and about 16°, in accordance with the sixth aspect of the invention. It is thus ensured that the skirt 42, toward its free end 42.1, presses against the respective seat 22.1, 24.1 to promote sealing between the respective end liner 22, 24 and the main casing portion 20 proximate the high pressure or wet end of the seal 40.

Further in this regard, the radially inwardly turned lip 46 at the free end of the skirt 42, which is in accordance with the fifth aspect, further enhances sealing in that area.

In accordance with the seventh aspect of the invention, the chamfered portions 48.1 of the land areas 48 facilitate feeding the seal 40 into the tapering seal cavity.

In accordance with the third aspect of the invention, the radially inward and radially outward faces of the limbs of the "U" shaped back 44 converge as they extend away from the back of the "U". Thus, in use, a complemental seal cavity will be provided to ensure that, during compression of the seal 40 during assembly, pressure is maintained in the region of the base 44 to ensure continued sealing in that area regardless of the status of the compression and deformation of the seal.

As mentioned at the outset, the main advantage of the seal in accordance with the invention is that it provides resilient sealing against the respective seats and that material of the seal, deformed during pressure-assembly, can flow into cavities intermediate the land areas, thus allowing the seal to be used in seal cavities having large tolerances in respect of size. It is important that each of the land areas 48 is of very little area near its radially outer extremity, and that the cross-sectional area increases with decreasing radius, thus being conducive to easy seating intitally and requiring a progressively larger deformation force as the land are is deformed.

The outwardly turned lip 44.2 at the free end of the outer limb of the base 44 enhances sealing against the seat 20.1.

The Applicant believes that this invention has an important advantage in so far as it provides a seal, which can be of an incompressible material such as rubber, and which is appropriate for sealing in cavities differing between wide limits in respect of size or volume. This is made possible by providing land areas and cavities inbetween land areas to allow deformation of the land areas into the cavities upon compression. The features of the seal described above enhance sealing and further allow easy assembly and dismantling.

The invention claimed is:

1. A seal for sealing between components of a rotary machine at an annular sealing interface where opposing surfaces of the components define an enclosed or partially enclosed seal volume, of generally predetermined shape, configuration and orientation, between relatively high pressure and low pressure zones, the seal being in the form of a ring of pliable material and defining a plurality of cavities arranged to accept deformed material to allow deformation of the material of the seal into the cavities, the seal including a base having an annular radially inner limb, an annular radially outer limb spaced radially outwardly from the inner limb and a web extending between ends of the radially inner and outer limbs such that the base is generally U-shaped in axial cross-section, an annular skirt which forms an extension of the inner limb and which extends generally longitudinally beyond the radially outer limb, which has radially inner and outer peripheral surfaces, and which is generally wedge shaped, the skirt tapering from a relatively thicker cross-section to a relatively thinner cross-section at a taper or free end thereof, which is intended to be positioned at a high pressure zone of the seal volume, in which said cavities alternate with land areas, the cavities and land areas being distributed peripherally, the land areas being in the form of elongate longitudinally oriented fingers which extend longitudinally from a back of the base between the radially inner and outer limbs beyond the radially outer limb to the free end of the skirt such that circumferentially spaced longitudinally extending cavities are provided between the land areas, cross-sectional surfaces through the land areas at respective radii decreasing progressively from a surface of the skirt to cause a compressive force, required to cause deformation of the land areas, to increase exponentially with an exponent larger than 1, the outer limb sloping towards the skirt away from the base and the land areas being chamfered towards their free ends.

2. A seal as claimed in claim 1, in which the cavities are open along the radially outer surface of the skirt, cross-sectional surfaces of the land areas at the outer periphery of the skirt being at a maximum the respective cross-sectional surfaces of the land areas increasing with decreasing radius.

3. A seal as claimed in claim 2, in which radially outer surfaces of the land areas are convexly rounded when viewed axially.

4. A seal as claimed in claim 1, wherein the base has along one surface thereof a projecting peripheral base lip configured to contact an annular zone of the seal volume.

5. A seal as claimed in claim 4, wherein said base lip is along a radially outer surface of the seal, and is oriented radially outwardly and toward a relatively high pressure end of the seal volume.

6. A seal as claimed in claim 5, wherein the base lip is in the form of a re-entrant lip along an outer peripheral surface of the base.

7. A seal as claimed in claim 1, wherein the skirt as at its free end, a skirt lip slanted to press against a corresponding annular portion of said high pressure zone.

8. A seal as claimed in claim 7, wherein the skirt is slanted radially inwardly to be offered to a radially inner surface of the seal volume in use.

9. A seal as claimed in claim 1, wherein one of the inner and outer peripheral surfaces of the skirt includes an oblique section shaped and oriented to match an opposing surface defining the seal volume, at angle selected to press an end of the skirt toward its free end against said opposing seal surface of the seal volume.

10. A seal as claimed in claim 9, wherein said oblique section is along the radially inner peripheral surface of the skirt, said oblique section being acylindrical and tapering toward the free end of the skirt.

11. A seal as claimed in claim 9, wherein said one end of the inner and outer peripheral surfaces of the skirt has, in series with said oblique section, a decumbent section oriented to align decumbently with a corresponding surface of the seal volume.

12. A seal as claimed in claim 11, wherein said decumbent section is cylindrical, is along the radially inner end of the seal surface, and is toward the low pressure end of the seal.

13. A combination of a rotary machine having components defining an annular sealing interface having radially inwardly and radially outwardly facing peripheral seats which define, at least partially an enclosed or partially enclosed seal volume, the radially inwardly facing seat diverging, radially outwardly and a seal as claimed in claim 1 accommodated within the seal volume.

14. The combination as claimed in claim 13, in which the rotary machine is a centrifugal pump.

15. The combination as claimed in claim 14, in which the centrifugal pump is a slurry pump.

16. The combination as claimed in claim 13, wherein the radially inwardly facing seat diverges axially outwardly in steps of increasing divergence angle.

* * * * *

UNITED STATES PATENT AND TRADEMARK OFFICE
CERTIFICATE OF CORRECTION

PATENT NO. : 7,823,887 B2  Page 1 of 1
APPLICATION NO. : 11/055561
DATED : November 2, 2010
INVENTOR(S) : Siegfried Geldenhuys It is certified that error appears in the above-identified patent and that said Letters Patent is hereby corrected as shown below:

Title page, Item (73), assignee: "Weir-Envirotech (Proprietary) Limited" should read
--Weir Minerals Africa (Proprietary) Limited--

Signed and Sealed this
Nineteenth Day of April, 2011

David J. Kappos
*Director of the United States Patent and Trademark Office*